United States Patent
Argumedo et al.

(10) Patent No.: US 12,400,479 B1
(45) Date of Patent: Aug. 26, 2025

(54) INTELLIGENT CONVERSATIONAL ASSISTANCE SYSTEM

(71) Applicant: UIPCO, LLC, San Antonio, TX (US)

(72) Inventors: Marta Leigh Argumedo, Helotes, TX (US); Yevgeniy Viatcheslavovich Khmelev, San Antonio, TX (US); Joshua Thomas Kelly, McKinney, TX (US); Jennifer Hunt Erickson, San Antonio, TX (US); Nathan Lee Post, Rockport, TX (US); Jose L. Romero, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 232 days.

(21) Appl. No.: 17/808,145

(22) Filed: Jun. 22, 2022

Related U.S. Application Data

(60) Provisional application No. 63/213,241, filed on Jun. 22, 2021.

(51) Int. Cl.
  *G06V 40/16* (2022.01)
  *H04L 65/1089* (2022.01)
  *H04M 3/51* (2006.01)

(52) U.S. Cl.
  CPC ........ *G06V 40/176* (2022.01); *H04L 65/1089* (2013.01); *H04M 3/5183* (2013.01); *H04M 2201/40* (2013.01); *H04M 2203/252* (2013.01)

(58) Field of Classification Search
  CPC ............. G06V 40/176; H04L 65/1089; H04M 3/5183; H04M 2201/40; H04M 2203/252
  See application file for complete search history.

(56) References Cited

U.S. PATENT DOCUMENTS

| | | | |
|---|---|---|---|
| 11,706,337 B1 * | 7/2023 | Mitchem | G06F 40/30 704/270.1 |
| 2010/0085414 A1 * | 4/2010 | Eun | H04N 7/14 348/14.02 |
| 2012/0288068 A1 * | 11/2012 | Jaiswal | G10L 17/26 379/88.01 |
| 2018/0075490 A1 * | 3/2018 | Chintalapoodi | G06Q 30/0261 |
| 2019/0244615 A1 * | 8/2019 | Bastide | G10L 25/63 |
| 2020/0358900 A1 * | 11/2020 | Carty | H04N 7/147 |
| 2021/0397311 A1 * | 12/2021 | Soini | G10L 15/26 |

* cited by examiner

*Primary Examiner* — Phung-Hoang J Nguyen
(74) *Attorney, Agent, or Firm* — Plumsea Law Group, LLC

(57) ABSTRACT

A method and system of providing guidance and information to service representatives by performing real-time emotion recognition of customers. The emotion recognition model evaluates video data and/or audio data of the customer during a communication session in order to determine a most likely emotional state for the customer at a given time. The system then generates content for the service representative based on the emotional state. The content can include identification of the emotional state, a suggested tone for the service representative to employ during the conversation, and recommended solutions to the customer's issue.

13 Claims, 12 Drawing Sheets

INTELLIGENT CONVERSATIONAL ASSISTANCE SYSTEM

CROSS-REFERENCE TO RELATED APPLICATION

This application claims the benefit of U.S. Provisional Patent Application Ser. No. 63/212,241 filed on Jun. 22, 2021 and titled "Intelligent Conversational Assistance System", the disclosure of which is incorporated by reference in its entirety.

TECHNICAL FIELD

The present disclosure generally relates to a method of providing services to end-users, and more specifically to enabling service providers to better respond to customers using on real-time guidance based on facial expressions of a customer.

BACKGROUND

Customer support and information centers, or call centers, are commonly set up by government agencies, organizations, and business operations to handle customer inquiries and to provide support for their products and services. For example, a customer support center may be a location with a few persons who handle incoming and outgoing customer calls. For larger organizations, the support center may be a dedicated facility with a large group of support personnel with advanced computers and telecommunication equipment, where the employees make calls and receive incoming customer inquiries. In some cases, a support center may handle customer calls concerning the repair or maintenance of their goods or services, or to otherwise interact with their customers. There are a wide range of applications that facilitate the activities of the support centers, such as sales applications, including order entry and reservation applications, financial services applications, including funds transfer and stock transactions, and customer service applications, including technical support, repair and claims handling.

However, while such remote communication and support centers are less expensive to operate, customers often describe such interactions as impersonal, and are generally rated lower in customer satisfaction. Customers prefer to interact with a "live" support person when experiencing a product concern or service issue, rather than being asked to respond to voice directions on a telephone or selecting user options on a computer screen. Although some support centers have sought to improve the level of customer attention by providing training sessions to their employees regarding customer service psychology, the quality of interactions can differ widely based on the ability of each support agent to understand the customer's emotional state.

There is a need in the art for a system and method that addresses the shortcomings discussed above.

SUMMARY

In one aspect, a method for facilitating customer support experiences by presenting information regarding a customer's emotional state to a support agent includes receiving, at a first time via a communication application, video data including images of the face of the customer. The method also includes determining, based on the video data, a first emotional state of the customer around the first time. The method further includes presenting, at a computing device for the support agent, a first message related to the first emotional state.

In another aspect, a method providing intelligent conversational assistance to an end-user during a communication session includes receiving, at a first time via a communication application, video data including images of a face of a participant. The method also includes determining, based on the video data, a first emotional state of the participant around the first time. In addition, the method includes presenting, at a computing device for the end-user, a first message providing a recommended solution to an issue concerning the participant, the recommended solution based in part on the determined first emotional state.

In another aspect, a system for facilitating customer support experiences includes a processor and machine-readable media including instructions which, when executed by the processor, cause the processor to receive, at a first time via a communication application, video data including images of the face of a customer. The instructions further cause the processor to determine, based on the video data, a first emotional state of the customer around the first time. In addition, the instructions cause the processor to present, at a computing device for a support agent, a first message related to the first emotional state.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1:
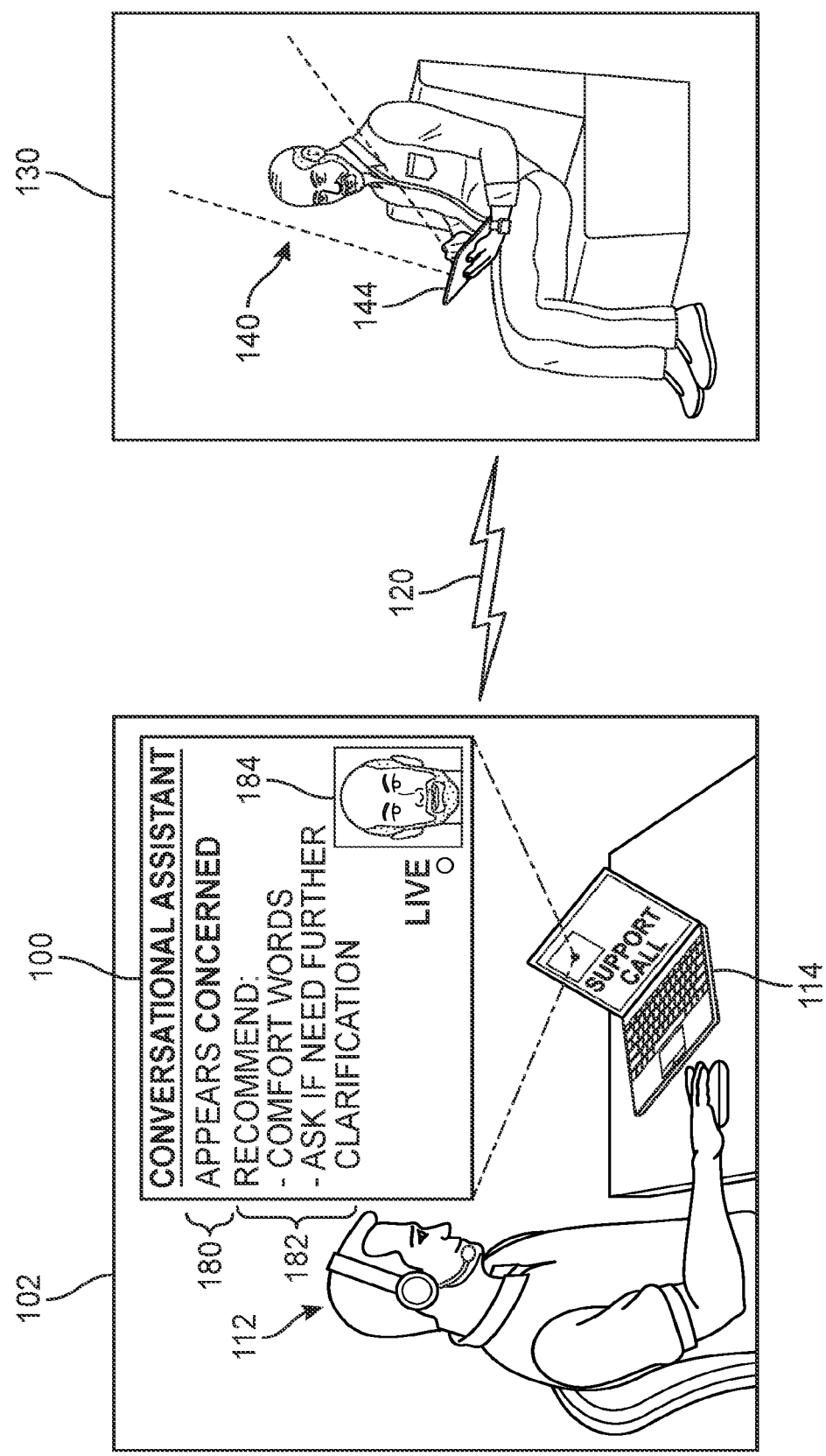
FIG. 1 is an illustration of a service representative using a conversational assistance system while communicating with a customer, according to an embodiment.

The embodiments provide a system and method for improving customer-agent interactions by the presentation of automated, intelligent recommendations and insights regarding the customer's disposition. Specifically, the embodiments provide a system and method for conveying information to a customer service representative during communication sessions through the display of messages from a dynamic virtual assistant. In this case, the service representative is at a location that is remote relative to the customer's location, such as at a call center. As will be discussed in greater detail below, the proposed systems and methods facilitate interactions with a customer by providing the service representative information about the customer's mood and/or emotional state.

Organizations and businesses often provide support to customers by making available to their customers one or more member service representatives (MSRs) or other customer representatives and service agents (referred to generally herein as "agents") who have access to networked computers, telephones, often networked to a larger corporate computer network, including mainframes, microcomputers and LANs. For example, voice and data pathways into the center can be linked through routing servers and computer telephony integration (CTI). In some cases, CTI also facilitates interfaces with customer support servers in addition to any e-mail system, databases and web-based services.

As used herein, a "customer service representative" (or simply, "representative", "agent", or "support agent") refers to any individual operating in a capacity to represent a service provider in interactions with a customer or user, and is the primary utilizer of the disclosed systems. The representative could be, for example, an employee at call center or a contractor or other person acting on behalf of call center for the service provider. In some embodiments, the representative may be a virtual artificially intelligent (non-human) agent. Additionally, representatives may be physically present at the call center and/or may be located remotely from call center and have calls routed through a computer system at call center to connect customers with the representative. A representative could operate within a larger customer service system (or department) of the service provider. For example, a bank could provide a customer service system that allows users to speak with representatives to help them obtain their account balances, pay bills, apply for and/or discuss loans, transfer money between accounts, wire money, get access to online services, troubleshoot technical problems associated with the bank's website, ask questions about forms and documents, as well as to help with any other suitable needs a user (or customer) might have. As another example, an insurance company could provide a customer service system that allows users to speak with representatives to help them with insurance policies and claims, as well as to help with any other suitable needs a user (or customer) might have.

A customer may contact or be contacted by an MSR to learn more about a service or product, obtain guidance, or purchase various items. Implementations of the proposed systems and methods may also include interactions with an agent, virtual or human, of a secured system. This service representative or agent is stationed at a location that is remote relative to the customer's location, such as a call center. As used herein, the term "customer" or "user" should be understood tor refer to any end-user or person requesting or receiving assistance or other communications from a secured system, including via a communication session with a remote agent. The customer can view at least one aspect of the interaction (e.g., text messages, video, screen-sharing, etc.) through a display of their computing device. For example, the customer may be using a video conferencing service or other communication tool to engage with the remote agent. In addition, the agent can view at least one aspect of the interaction through a display, such as image data of the customer. As part of this arrangement, the agent's display is connected to a computing device that can receive information in real-time in order to determine the most likely disposition of the customer and/or tailored approaches that would increase customer satisfaction.

It should be understood that while the following description presents a sequence of examples illustrating the use of the proposed systems and methods in a customer-agent dynamic, in other embodiments, the proposed systems may be utilized by a broad range of end-users, including other types of work calls (e.g., healthcare field, negotiations, etc.) and personal calls. For example, there are many occasions in which a person is on a call and wishes to better understand the disposition of the person with whom they are speaking, and/or receive suggestions regarding the conversational tone in order to move toward a desired outcome. By making use of this type of system, more individuals can learn techniques improving emotional regulation, helping to increase understanding and/or awareness of others and, in some cases, offer therapeutic or other types of emotional support.

For purposes of introduction, an overview of one embodiment of the proposed systems and methods is illustrated with reference to FIG. 1. In FIG. 1, an example of an interaction in which a conversational assistance system ("system") is employed is depicted. In this example, system is configured to receive image and/or audio data from a first user 140 so as to provide insights and/or recommendations to a first service representative ("first agent") 112 located at a remote site 102, such as a call center.

In addition, the first user 140 is shown with a first computing device ("first device") 144, seated on a sofa in a first physical space such as their home. The first device 144 can include an electronics unit comprising a plurality of different components, such as a user interface component (e.g., a touchscreen display, keyboard, mouse, etc.), a sensor unit (including one or more cameras or other image-based sensors), a user interface module, a processor, and/or a communication module. In some embodiments, the first device 144 may also include a microphone and speaker. In this example, first device 144 is a computer tablet. First device 144 may further include a system including one or more processors and memory. Memory may comprise a non-transitory computer readable medium. Instructions stored within memory may be executed by the one or more processors. The first device 144 may be configured to receive and analyze data from various sensors associated with the sensor unit in the first device 144 or data that is communicated from external components or devices to first device 144. In different examples, the sensor unit includes a variety of sensors. The sensors can include one or more of an image sensor, a light sensor, a microphone, a speaker, camera, among others.

A communication module may allow the first device 144 to communicate wirelessly. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In FIG. 1, the first user 140 uses first device 144 to capture and transmit views 184 in real or near-real time of the first user 140 while the first user 140 is engaged in a communication session with the first agent 112. The first agent 112 is also equipped with a second computing device ("second device") 114 through which he is able to send data to and receive data from first user 140 across a network 120. In this encounter, the first agent 112 utilizes the communication support software available through his second device 114 to view images captured by cameras associated with first device 144 in first physical space 130.

In this example, it is to be understood that at a time prior to the current communication session between first user 140 and the first agent 112, the first user 140 provided consent to the use of his video data. In different embodiments, the system is configured to process the image data received over network 120 and attempt to characterize the facial expressions and/or tone of the first user 140. In one example, the result of such characterization can be presented via a conversational assistant user interface ("interface") 100 describing the first user's likely disposition and/or recommendations based on said disposition. As shown in FIG. 1, in some embodiments, interface 100 can indicate a characterization 180 ("Appears Concerned") of the first user's emotional state based on the acquired image data. Furthermore, in some embodiments, the interface 100 can include one or more recommendations 182 ("Recommend:—Comfort words;—Ask if need further clarification"). In response, the first agent 112 can adjust his own approach, either applying one of the suggestions, presenting other solutions, or simply changing his own tone.

Figure 2A:
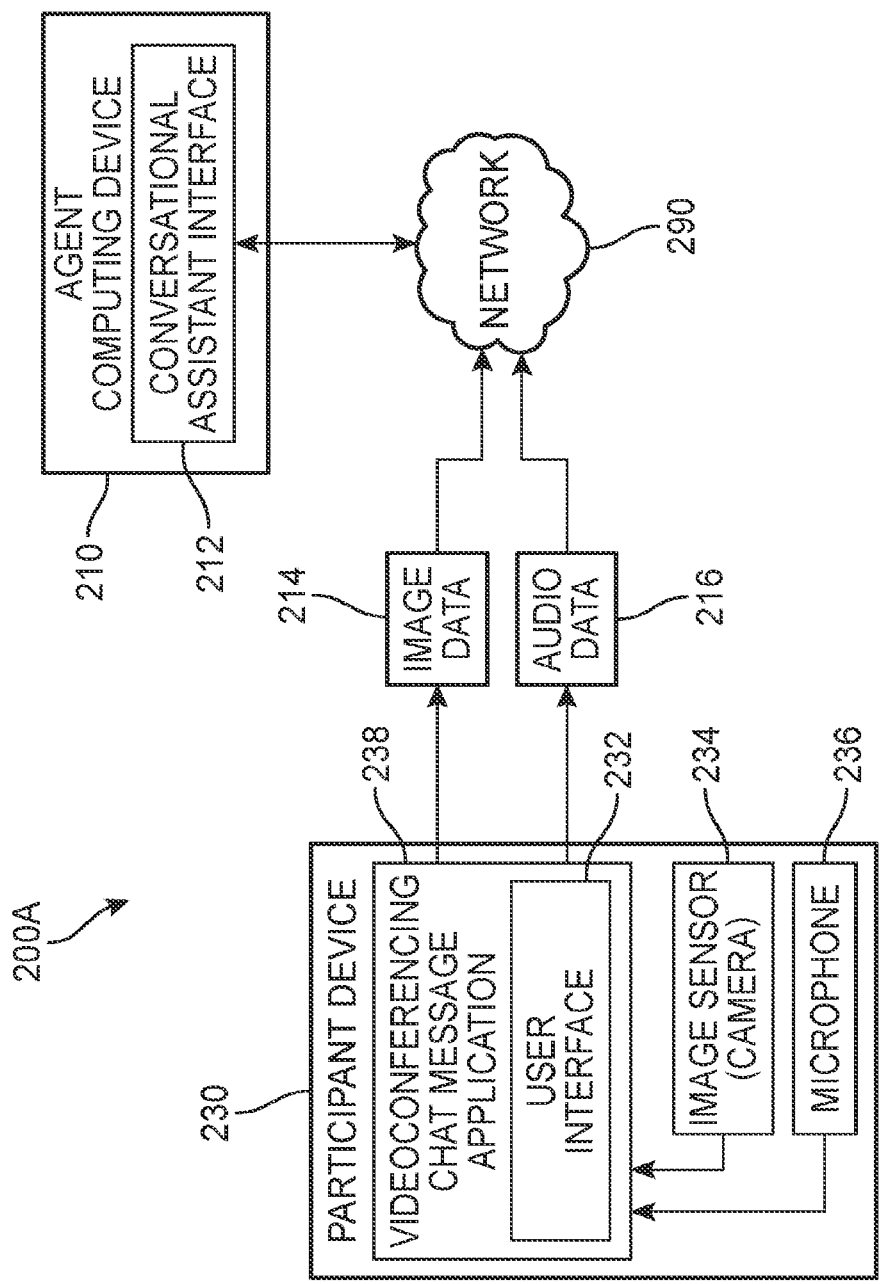
FIGS. 2A and 2B present a schematic diagram of a system for providing guidance to an end-user in a communication session based on emotion recognition of another participant in the communication session, according to an embodiment.
Figure 2B:
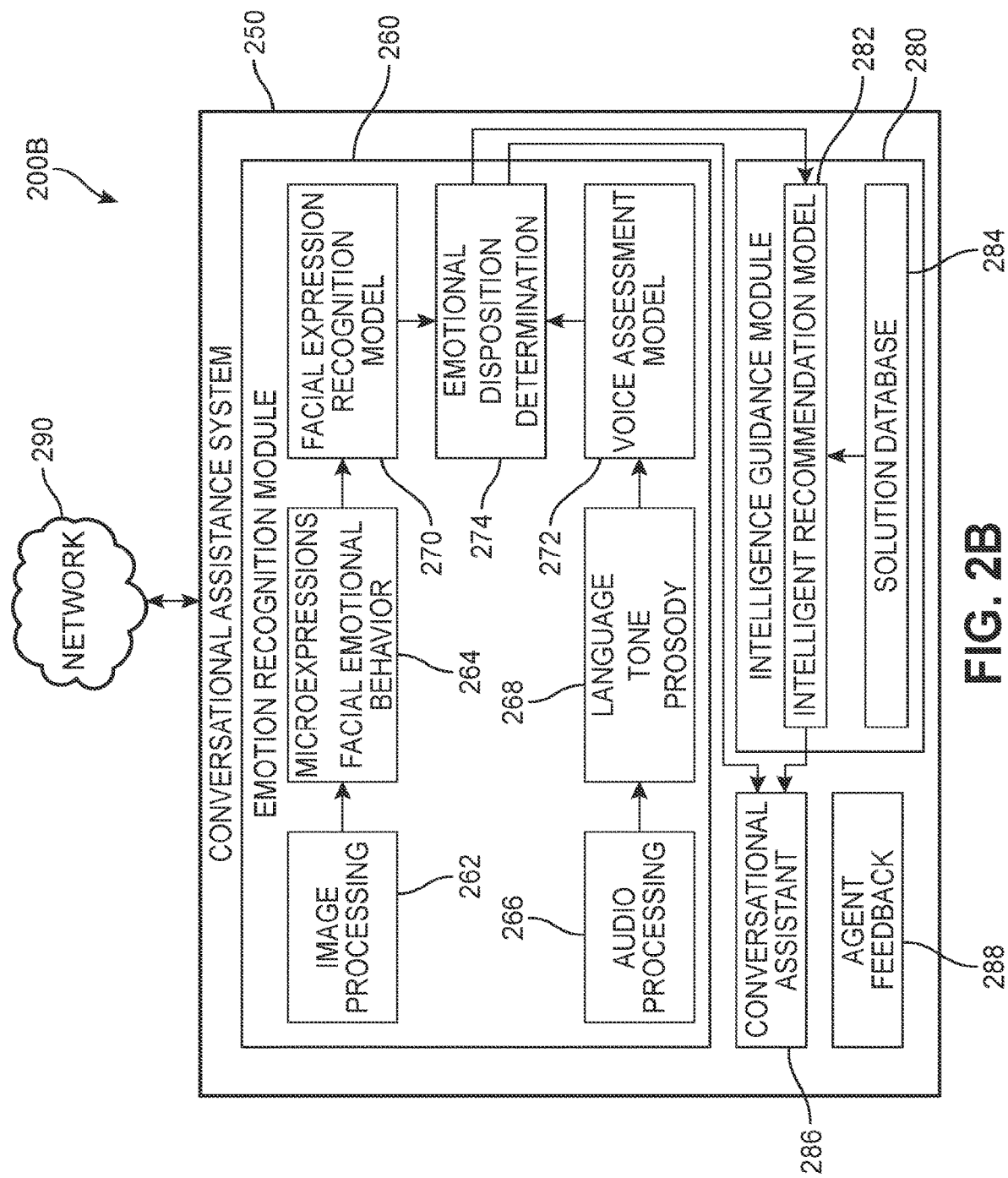

In order to provide the reader with a greater appreciation of the embodiments, FIGS. 2A and 2B depict an overview of an embodiment of a customer assistance environment ("environment") 200 in which customer image and/or audio data is monitored and associated information presented to a support agent via a conversation assistant interface 212. It should be understood that the two figures are separated for purposes of clarity, and that the two drawings represent a single diagram. In addition, as noted above, in some embodiments, the system 200 includes or has access to an intelligent guidance module ("guidance module") 280 configured to provide customized recommendations to the support agent in order to potentially improve the customer interaction experience and help the support agent facilitate the dialogue.

As shown in FIG. 2A, the environment 200 includes a participant computing device ("participant device") 230 that is configured to communicate with an agent computing device ("agent device") 210, for example via a Wi-Fi, cellular, or other network connections 290. While the various components of environment 200 are shown as being accessed through a cloud network and/or stored on a cloud-based server in FIGS. 2A and 2B, in other embodiments some or all components or modules described herein can reside in participant device 230 and/or agent computing device 210.

In different embodiments, the participant device 230 includes a device display ("display") that can present information and media for a product/service, for example via a videoconferencing-chat messaging or other communication application ("app") 220 that can connect the participant with the support agent. For example, a customer can receive and send information through a user interface 232 that may be presented on the device display. The user interface 232 and display may represent a common component or may represent separate physical or functional components. In some embodiments, the display may be a touchscreen, allowing the customer to interact with the user interface directly by touch. The user interface may refer to an operating system user interface or the interface of one or more software applications that may run on the participant device 230. In addition, in some embodiments, when the customer launches the app 238 on participant device 230, they may be shown an option to initiate a screen sharing function, whereby content currently being displayed on the participant device 230 is transmitted to the agent computing device 210. In some embodiments, the user interface 216 can include a messaging window or other chat-space by which the support agent may send text messages or other digital content. Alternatively, in some embodiments, the customer can also speak with the support agent via a voice calling application on participant device 230, or directly through a telephone or other external device, such as a cell phone or more general videoconferencing system.

Although not shown in FIG. 2A, it should be understood that a virtual or human support agent can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, the agent device 210 can be connected to or include an internet customer interface for providing support specifically to customers or members who contact them via the Internet. As a general matter, support agent can refer to any person or personnel who offers the caller (or person who was called) assistance, and has access to features of the system 250 during the communication session with the customer.

Referring to FIG. 2B, in different embodiments, the customer may, upon encountering a concern, query, problem, or other issue with a product or service associated with the company, organization, or other entity employing the system 202, attempt to address the issue via app 238. The app 238 can represent an interactive platform that provides a site from which the customer can create and maintain an account, access information and options related to the entity and its products or services, review and/or modify their account details, and/or communicate with personnel of entity. For example, the customer can offer various inputs via participant device 230 that are received by an input processor of the app 238. In some embodiments, a customer monitor component of app 238 is configured to collect image data 214 and/or audio data 216 during some or all of the communication session. In other embodiments, the collection process may be performed by a component that is external to app 238. The customer monitor component or other collection module will be in communication with the system 202. During the call, the image data 214 and/or audio data 216 can be received by an emotion recognition module 260 for processing. In some embodiments, the customer monitor component can be configured to automatically transfer the data in real or near real-time to the system 202, every few seconds, and/or in response to the support agent's request(s) for information from the conversational assistant.

In different embodiments, a communication session may be initiated directly by the customer (e.g., via a telephone number, an in-app chat or videoconference) or the customer may ask that a support agent initiate the communication session from their end. Once a request for a communication session has been received, the user may be asked to provide consent to the data collection, or the consent may have occurred earlier (e.g., when the participant installed the app). In some embodiments, the system 202 can be configured to automatically generate an initial report regarding the customer's emotional state, or such a report may be generated in response to a request by the support agent. In some cases, the data collection may begin while the customer is on hold prior to the support agent beginning to speak to him/her to provide the initial report.

In different embodiments, when the support agent begins the communication session, the system 202 may be automatically activated and remain in a 'dormant' mode until activated by the support agent, or may immediately switch to an active or enabled mode when the communication session begins. In another embodiment, the system 202 may be configured to show pertinent information to the support agent automatically when it determines the customer is presenting a negative emotional state (e.g., anger, sadness, fear, etc.) in order to alert the support agent.

In some embodiments, as shown in FIGS. 2A and 2B, image data 214 can be received by and processed via an image processing module 262 and/or the audio data 216 can be received by and processed via an audio processing module 266. In different embodiments, only one of the two data types may be collected and used by the emotion recognition module 260, while in other embodiments, both types of data will be used. Once the data has been processed, relevant features may be extracted for use as input by the emotion recognition model, including image features 264 including but not limited to micro-expressions and/or other macro-facial emotional behavior and audio features 268 including but not limited to language, tone, and/or prosody. As a general matter, facial micro-expressions are rapid involuntary facial expressions which reveal suppressed affect. Micro-expressions are typically very rapid ($\frac{1}{3}$ to $\frac{1}{25}$ second; the precise length definition varies) involuntary facial expressions which give a brief glimpse to feelings that people undergo but try not to express. More normal macro-expressions are more intentional and typically last at least half a second, and can also provide a wealth of information regarding a person's emotional state.

A facial expression recognition model ("facial model") 270 can receive the processed image data. A wide range of algorithms for interpreting emotion from facial-based data are available. For example, facial model 270 may use facial geometric features, appearance-based facial features, and a combination of these two features to perform facial expression recognition. In some cases, the model can divide the face into many small-size grids, and the features from all these grids are concatenated to identify the facial expressions. Region of Interest (ROI) features from facial images and thermal images may also be used for detecting emotions. As another example, a triangular approach-based emotion recognition system using a Fuzzy rule-based system, for categorization of six basic emotions (happiness, anger, fear, surprise, sadness, and disgust) can be used.

For a real-time emotion recognition system, additional or hybrid approaches can also be employed. For example, a triangulation method used to connect facial action units in a subject face can be used to detect seven facial expressions such as happiness, anger, afraid, surprise, sadness, neutral, and disgust. A multiclass support vector machine (SVM) classifier performs well based on spatiotemporal features in classifying the emotional expressions. More conventional (SVM, Multi-Layer Perceptron (MLP)) algorithms and deep learning methods (Convolutional Neural Network (CNN), Alexnet CNN, Affdex CNN) based facial expression recognition of four emotions (happiness, sadness, anger, and fear) can also be used. In another example, the model is configured to classify a face based on the emotion shown in the facial expression into one of seven categories (e.g., 0=Angry, 1=Disgust, 2=Fear, 3=Happy, 4=Sad, 5=Surprise, 6=Neutral). Moreover, in some embodiments, spatial and temporal information from video sequences can be used to classify different facial expressions using CNN, Ensemble Multi-level CNN, and Long Short-term Memory (LSTM).

In yet another example, a mathematical model may be used that places automated virtual markers in defined locations on the subject's face. The proposed algorithm then formulates different triangles by manipulating the markers' positions as an edge of each triangle. An Optical Flow Algorithm is used to track each marker movement while facial expression occurs and predicts the future triangle features. The movement of the markers during facial expressions directly changes the property of each triangle, and the triangle area and perimeter are extracted as the features to classify the facial expressions. These features are statistically validated using one-way analysis of variance (ANOVA) and box plots. Finally, the statistically significant features are mapped into corresponding facial emotion expressions using six nonlinear classifiers, namely, K Nearest Neighbor (KNN), Probabilistic Neural Network (PNN), Random Forest (RT), Decision Tree (DT), Extreme Learning Machine (ELM), and SVM. In some embodiments, the facial model 270 can be configured to use temporal interpolation together with Multiple Kernel Learning (MKL) and Random Forest (RF) classifiers to assess micro-expressions.

Thus, the technologies used in this field of emotion detection typically work by detecting a face, identifying the crucial points in the face which reveal the emotion expressed and processing their positions to decide (classify) what emotion is being detected. Some non-limiting examples of facial expression models include Emotion API (Microsoft® Cognitive Services), Affectiva, nViso, and Kairos. These models are presented for illustrative purposes only; it should be understood that other facial emotion recognition models known in the art may also be used.

In some embodiments, additional processing may be performed on the audio data. For example, audio data may be optionally formatted to natural language by a natural language understanding (NLU) processing and generation system module (not shown here) in order to determine the words being spoken. The processed data is then input into a voice assessment model ("voice model") 272. It may be appreciated that spoken words naturally contain linguistic and paralinguistic elements that are both important and mutually informative for communication. The linguistic information consists of the literal, symbolic meaning of the word, whereas the paralinguistic information consists of the physical, contextual form of the word. For example, the meaning of the word "mad," whether spoken in the sense of "mentally disturbed," "furious," or "wildly excited," can be disambiguated based on evaluation of contextual paralinguistic information such as the speaker's current emotional status, as disclosed by their voice tone. The voice paralinguistic and linguistic cues are separated such that the low-frequency band primarily carries prosodic cues important for communication of emotions, whereas the high-frequency band primarily carries phonemic cues critical for verbal communication.

Thus, when a person starts talking, they may generate information in two different channels: primary and secondary. The primary channel is linked to the syntactic-semantic part of the talking (what the person is literally saying), while the secondary channel is linked to paralinguistic information of the speaker (tone, emotional state, and gestures). For example, someone may say "That's so funny" (primary channel) with a serious tone (second channel). By looking at the information of the primary channel, the message appears to be that the speaker thinks that something is funny, but by looking at the information received by the second channel, it becomes understood that the real meaning of the message is that the speaker is lying or being sarcastic. In different embodiments, the voice model 272 can detect such intonations in the speaker's speech, and/or changes in amplitude (i.e., volume) of the speaker's speech or other voice cues and identify or characterize (classify) them accordingly. Some non-limiting examples of such models include Beyond Verbal, Vokaturi, EmoVoice, and Good Vibrations.

In different embodiments, an emotional disposition determination module 274 may receive the predictions of one or both models to generate a final prediction of the customer's emotional state, or the emotional state that has the greatest probability of corresponding to the customer's current emotional state. The customer's predicted mood may be presented to the support agent via a conversational assistant module 286 that is in communication with conversational assistant interface 212. In some embodiments, the mood may be identified by a text-based description, colors (e.g., red-tones for unhappy, green-tones for happy, etc.) or symbols such as emoji-type faces or, for example, up-arrows for happy and down-arrows for sad.

In addition, in different embodiments, the system 202 can further include guidance module 280. The guidance module 280 is configured to receive the output from the emotional disposition determination module 274 as input for an intelligent recommendation machine learning model ("model") 282. In some embodiments, the input can also include specific types of information that may be collected by app 238 and/or agent device 210, such as the customer's specific issue and/or concerns, the solutions already offered or attempted, the time the customer has been on the call or was on hold, etc. These and other data can be used by the model 282 to determine whether there is a solution(s) or process that is more likely to result in a successful outcome for the customer that has not yet been attempted or may be attempted via a different mechanism or process. In some embodiments, the model 282 can be configured to connect to a solution database 284 that includes a repository of common issues and their corresponding suggested solutions. Based on the information available, the model 282 can determine if there are one or more solutions that could be applicable, and transmit this information to conversational assistant module 286. These intelligent recommended insights and actions can then be automatically or responsively presented to the support agent, for example via conversational assistant interface 212. The support agent can then choose to implement or offer the suggested tool or action with the customer. In some embodiments, the support agent may be able to disregard the first recommendation and ask the system to generate an alternative next-best option. Furthermore, in some embodiments, the model 282 can be configured to identify a suggested tone or approach for the support agent to employ during the communication session, where the suggested tone is most likely to help appease, placate, or otherwise moderate the conversation with the customer. The suggested tone can be based on the output of the emotion recognition module and a set of responsive tones (e.g., comforting, encouraging, cheerful, consoling, reassuring, serious, etc.) that may be linked to the emotion that was generated and/or the percentage that emotion represented the customer's mood. For example, a recognized emotion of 'angry' may be linked to a suggested tone of 'calming', 'soothing', or 'serious', while a recognized emotion of 'confusion' may be linked to a suggested tone of 'reassuring', 'clarifying', or 'explanatory', and a recognized emotion of 'amused' may be linked to a suggested tone of 'light-hearted', 'cheerful', etc.

In addition, in some embodiments, the model 282 can be configured to learn over time. In some embodiments, the model 282 can receive agent feedback 288 directly from support agent (i.e., as manual input) and/or automatically via agent device 210 upon termination of the communication session. For example, if the issue was successfully resolved using the recommended solution generated by the model 282, the model is reinforced. If the recommended solution was ineffective, the model can reassess the value of that recommendation for future instances of the same issue. In addition, if a solution was successfully implemented that was different from the recommendation, the model can incorporate this as a new option for similar cases.

It should be understood that in other implementations, environment 200 can include additional or fewer modules or can include one or more additional computing devices or related server devices. The modules of environment 200 can be associated with the various local computing devices and, for example, can be disposed within the computing device. In alternative implementations, the modules of environment 200 can include independent computing devices that are coupled to, and in data communication with, the local computing devices. As used in this description, the term "module" is intended to include, but is not limited to, one or more computers, processing units, or devices configured to execute one or more software programs that include program code that causes a processing device(s) or unit(s) of the computer to execute one or more functions. Processing units can include one or more processors (e.g., microprocessors or central processing units (CPUs)), graphics processing units (GPUs), application specific integrated circuits (ASICs), or a combination of different processors. In alternative embodiments, systems and modules can each include other computing resources/devices (e.g., cloud-based servers) that provide additional processing options for performing one or more of the machine learning determinations and calculations. The processing units or devices can further include one or more memory units or memory banks. In some implementations, the processing units execute programmed instructions stored in memory to cause system, devices, and modules to perform one or more functions described herein.

The memory units/banks can include one or more non-transitory machine-readable storage mediums. The non-transitory machine-readable storage medium can include solid-state memory, magnetic disk, and optical disk, a random-access memory (RAM), a read-only memory (ROM), an erasable programmable read-only memory (e.g., EPROM, EEPROM, or Flash memory), or any other tangible medium capable of storing information.

Figure 3:
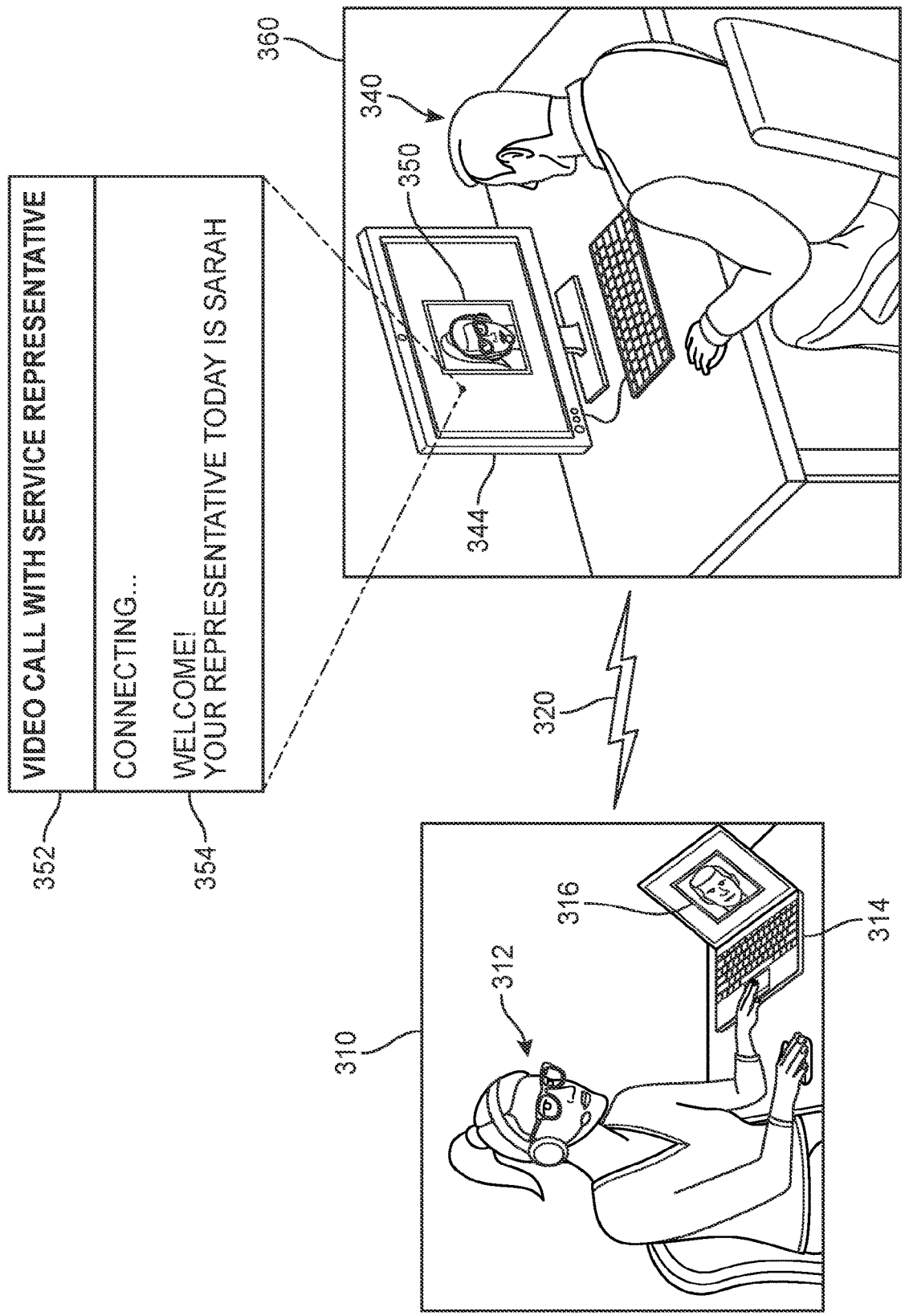
FIG. 3 is an illustration of a customer initiating a call with a service representative, according to an embodiment.

Referring now to FIGS. 3-10, a sequence of drawings illustrates one example of a use of a conversational assistance system ("system"). In different embodiments, the customer can instead initiate the call himself/herself via telephone, or submit a message or other request via an in-app communication platform. In some embodiments, the customer can transmit a request to initiate a communication session to a customer support center via a web application or tele/video conferencing application. Referring to FIG. 3, a support representative 312 with a laptop 314 at a remote location 310 (e.g., a call center) is illustrated participating in a communication session with a second user 340 via a desktop computing device 344 over a network 320. The second user 340 is at home 360, accessing the communication session via a first communication app ("first app") 352 ("Video call with Service Representative"), which can include a videoconferencing component 350 and, in some cases, an optional chat message component 354 ("Connecting . . . Welcome! Your representative today is Sarah"). For purposes of convenience the chat message component 354 will be shown in order to describe the conversational dialogue. However, in general, such conversation will occur using voice-data, which will be used by the audio model as described in FIGS. 2A and 2B. In some embodiments, the support representative 312 can interact with the second user 340 via a corresponding second communication app ("second app") 316 that may be another instance of the same software as first app 352, or provide additional and/or different functionality. In this case, the second app 316 is presenting a substantially real-time or live video feed of the second user.

Figure 4:
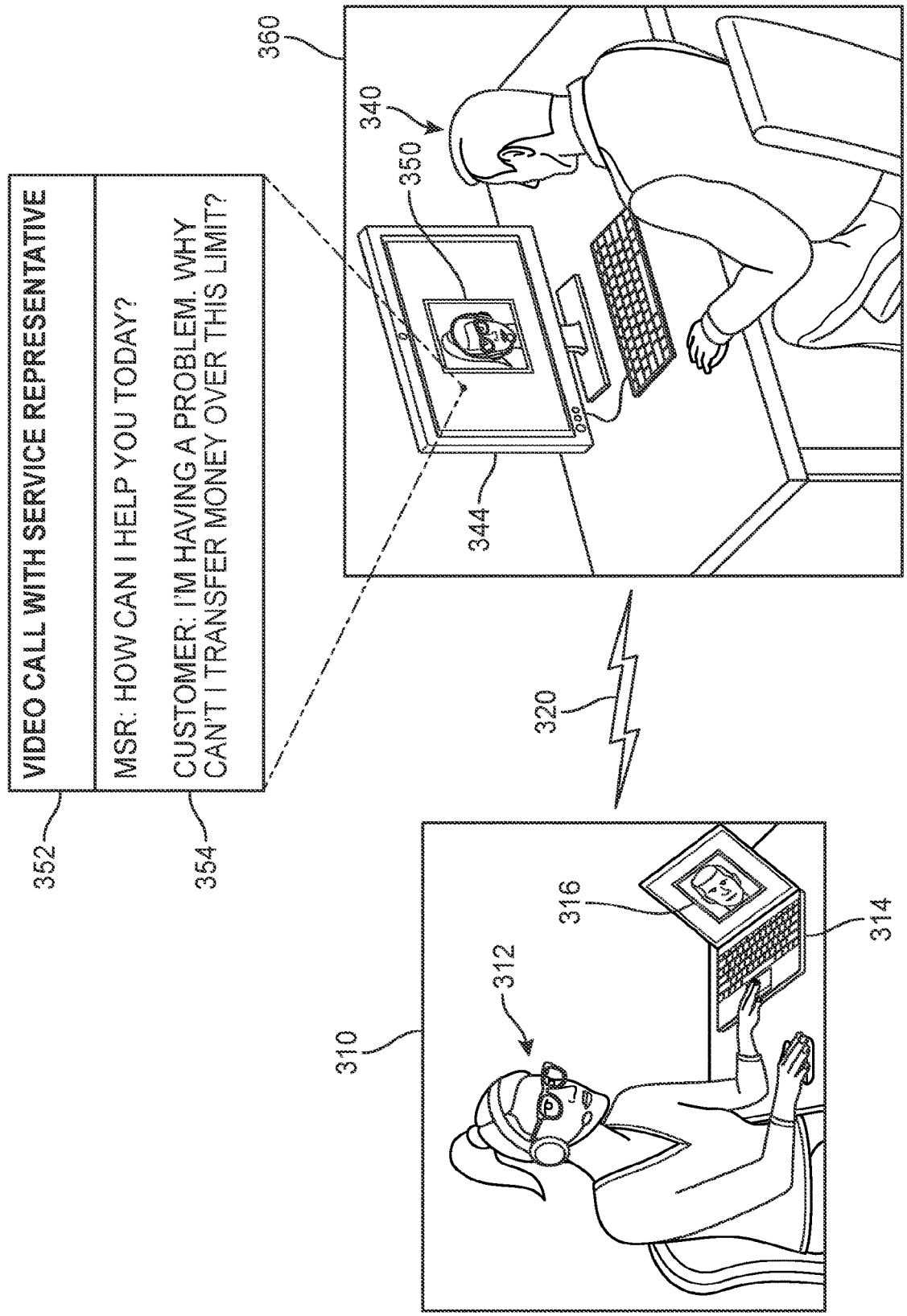
FIG. 4 is an illustration of the customer describing a problem to the service representative over a videoconferencing application at a first time, according to an embodiment.
Figure 5:
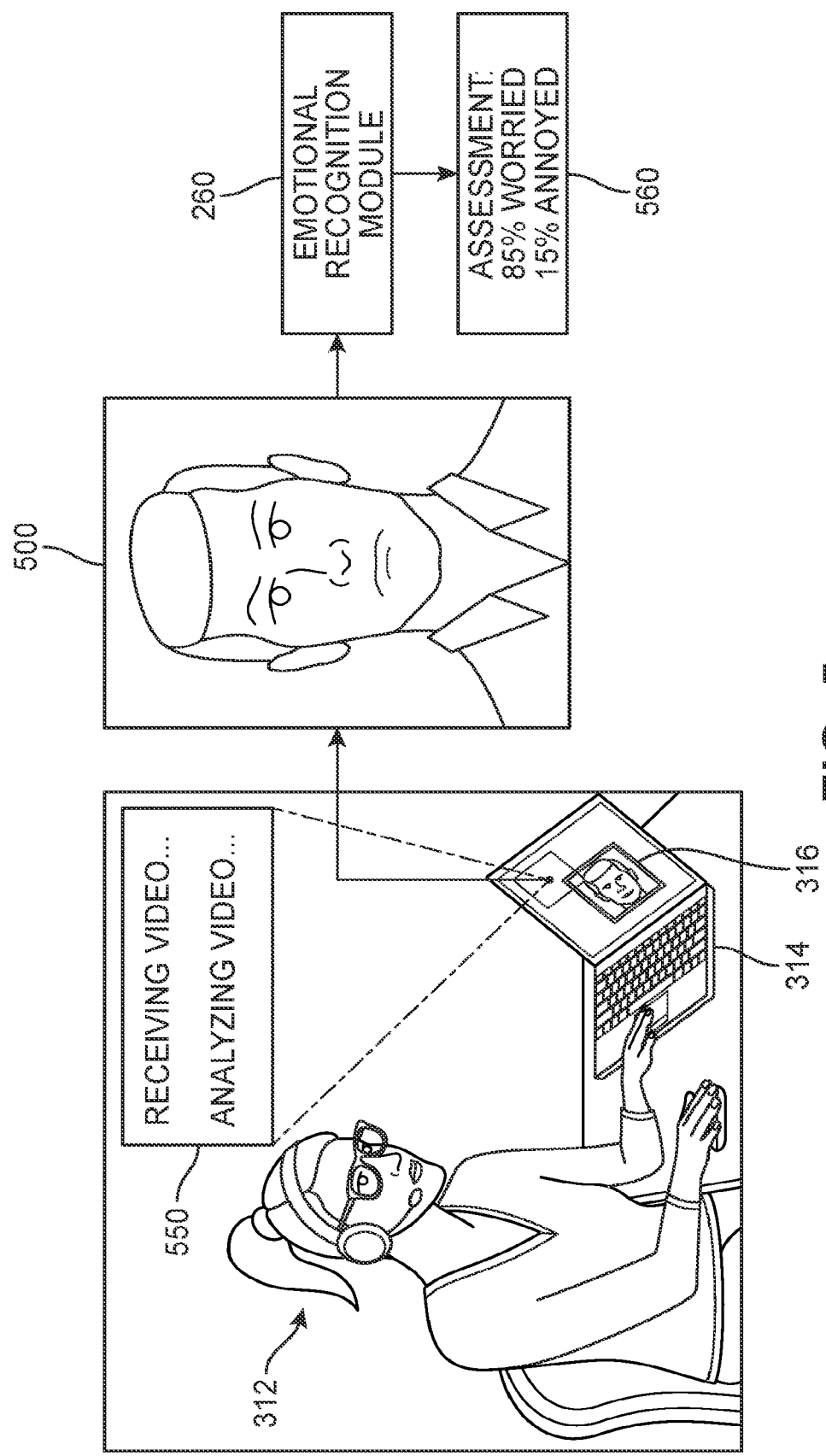
FIG. 5 is an illustration of a conversational assistant system determining an emotional state of the customer around the first time, according to an embodiment.

In FIG. 4, the second user 340 (also referred to as the customer) is shown responding to a query from the support representative 312 via chat message component 354 ("MSR: How can I help you today?/Customer: I'm having a problem. Why can't I transfer money over this limit?"). As the support representative 312 is engaging in this dialogue, an embodiment of the conversational assistance system (see FIGS. 2A and 2B) may be enabled or accessed, either manually by the support representative 312 or automatically when the communication session begins. This is shown in FIG. 5, where a new interface has opened in the display of laptop 314. As discussed above, in different embodiments, a conversational assistant interface ("conversational assistant") 550 can present various types of information that may be of use to the support representative 312 throughout the conversation with the customer.

In FIG. 5, the conversational assistant 550 indicates that a first data 500 (here comprising primarily video data) has been received. The first data 500 (represented by a video-image of the second user's face) is sent to the emotion recognition module 260 (see FIGS. 2A and 2B), which generates a first assessment 560 ("Assessment: 85% Worried 15% Annoyed"). This assessment is shown merely for purposes of illustration. It should be understood that in other examples, the assessment may be generated with a broader single-emotion categorization, include more nuanced emotional determinations, exclude a percentage, or include alternate or additional information such as the primary reasons why the generated assessment has selected these emotion(s). The assessment can then be presented to the support representative 312 via the conversational assistant 550 using words, symbols, colors, or numbers (e.g., on a scale of 1 to 10 what is the customer mood, etc.).

Figure 6:
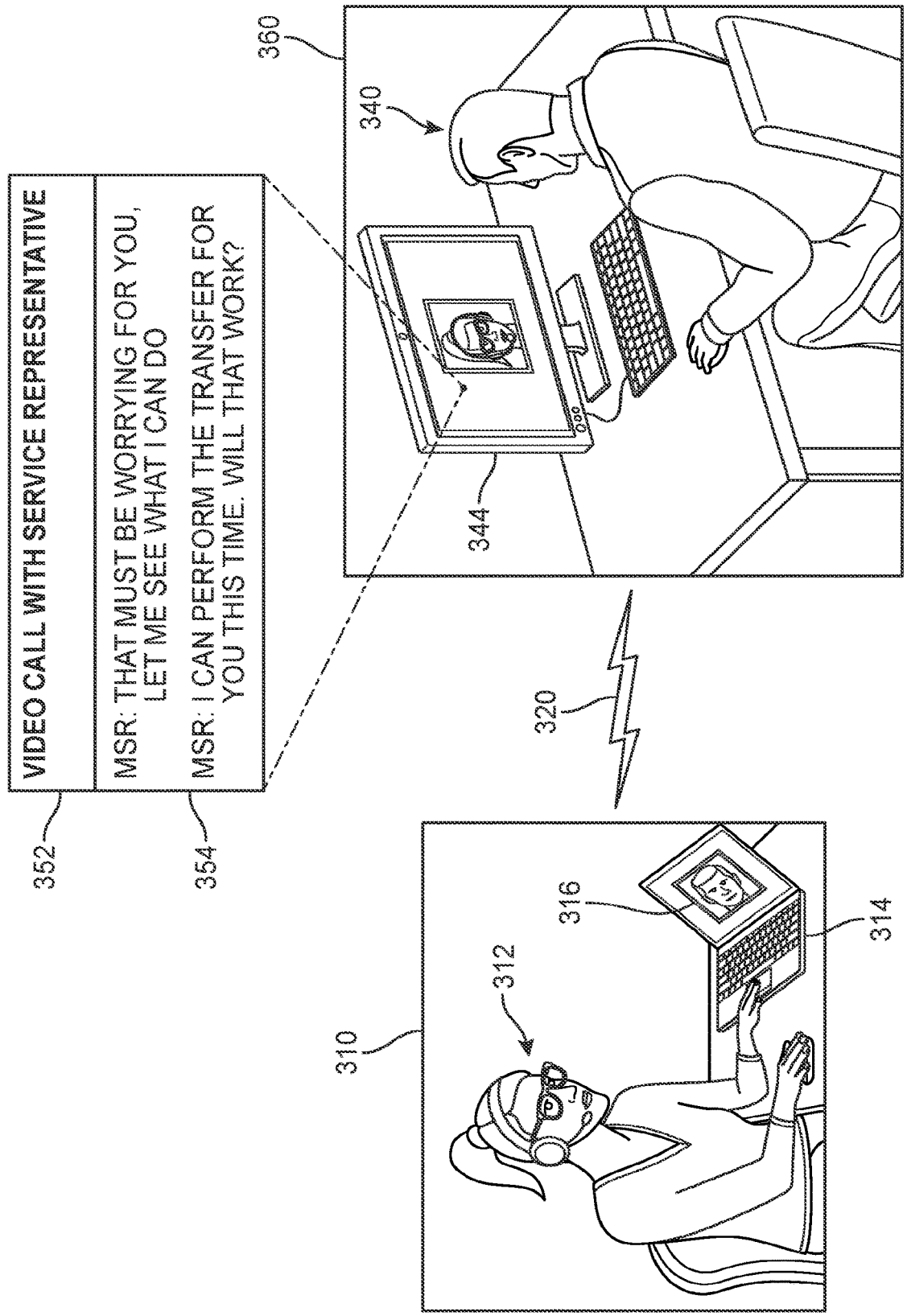
FIG. 6 is an illustration of the service representative responding to the customer at a second time, according to an embodiment.
Figure 7:
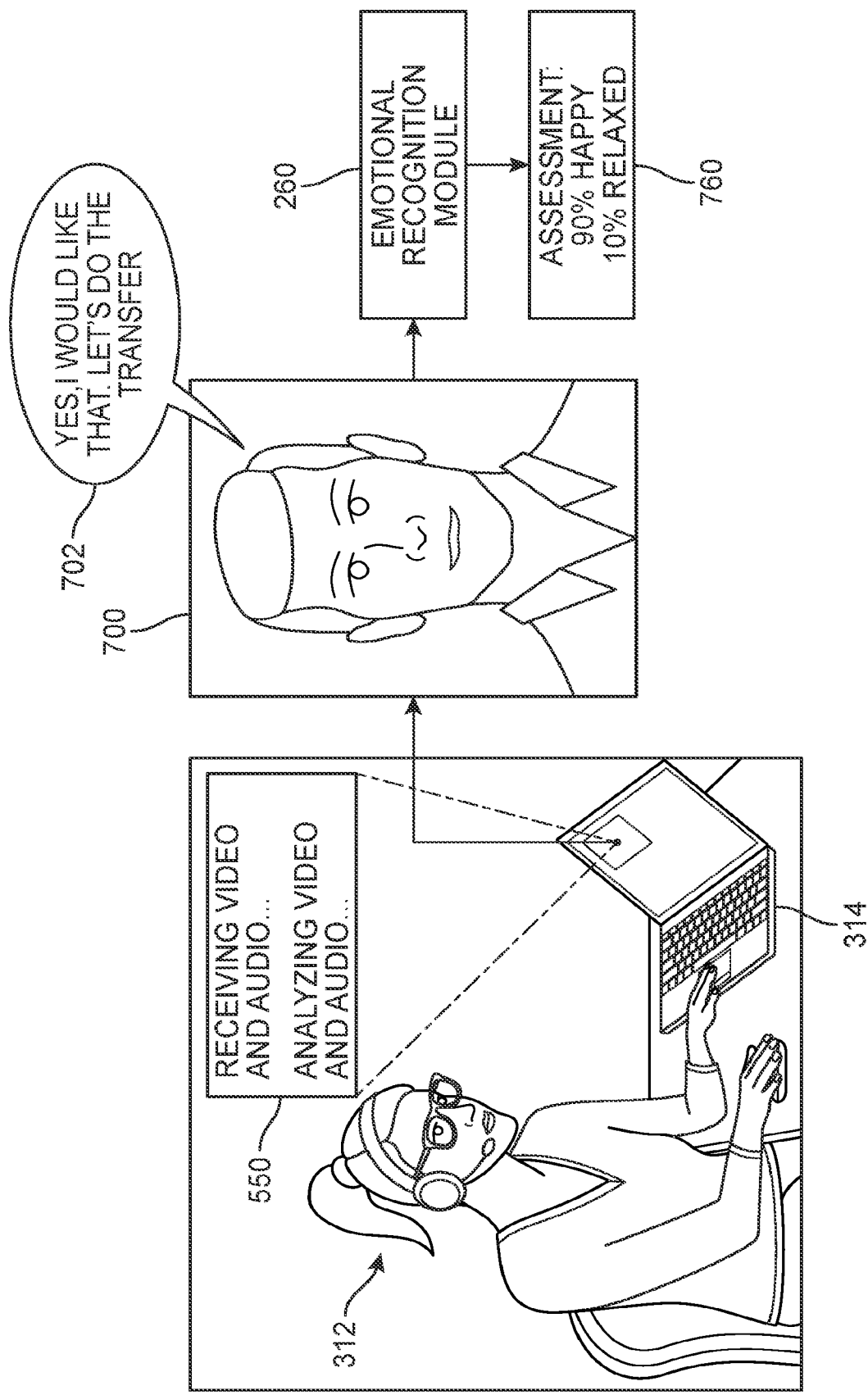
FIG. 7 is an illustration of the conversational assistant system determining an emotional state of the customer around the second time, according to an embodiment.

In FIG. 6, the support representative 312 is able to incorporate the knowledge obtained from the conversational assistant into her dialogue with the second user 340. For example, the chat message component 354 conveys her ability to empathize ("MSR: That must be worrying for you, let me see what I can do . . . . MSR: I can perform the transfer for you this time. Will that work?"). The customer's changed mood in response to the support representative's help is reflected in the subsequent figure. In FIG. 7, the conversational assistant 550 indicates that a second data 700 (here comprising both video data and audio data) has been received. The second data 700 (represented by a video-image of the second user's face as well as a voice-bubble 702 ("Yes, I would like that. Let's do the transfer")) is sent to the emotion recognition module 260. The emotion recognition module 260 generates a second assessment 760 ("Assessment: 90% Happy 10% Relaxed"), again shown merely for purposes of illustration.

Figure 8:
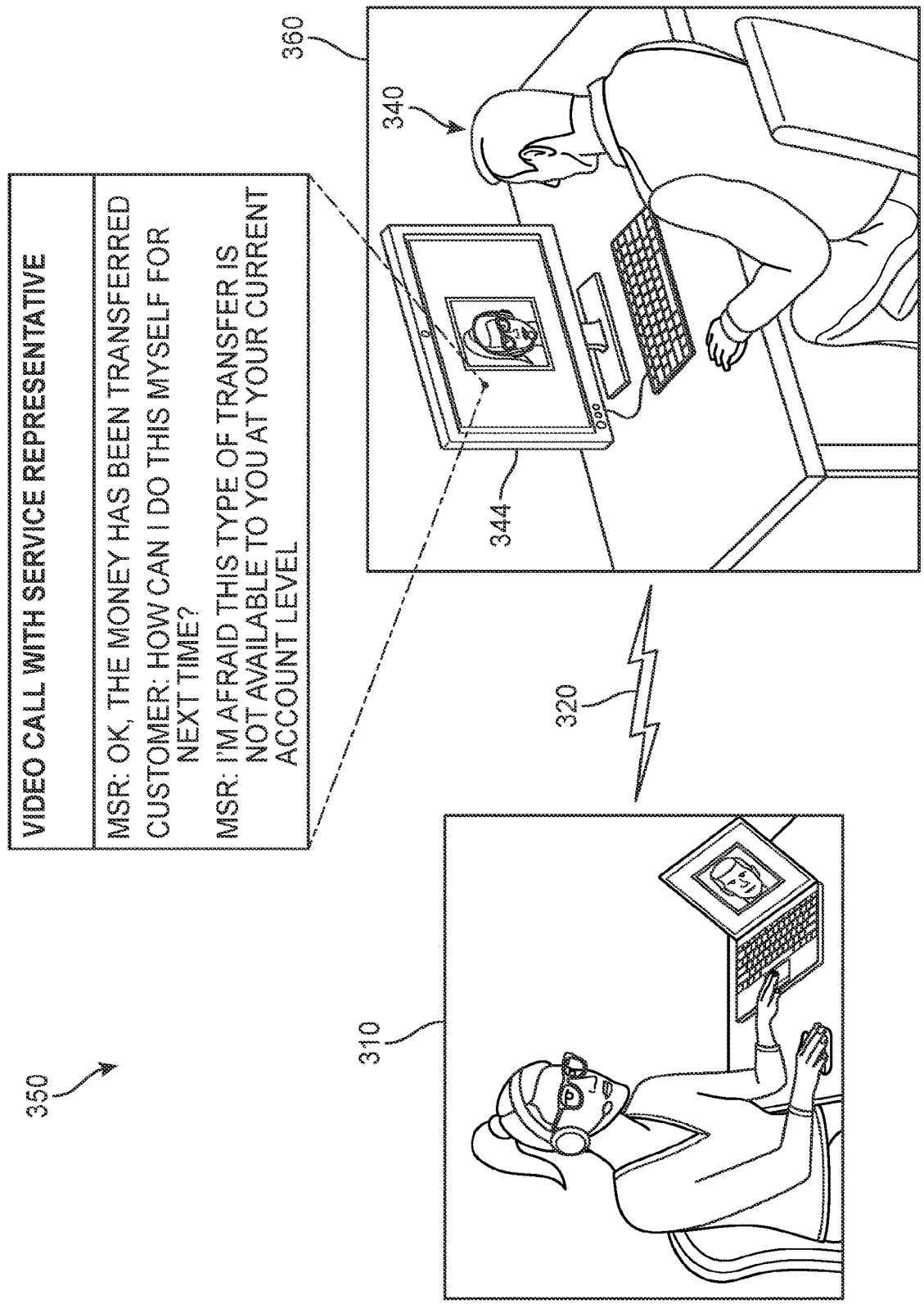
FIG. 8 is an illustration of the service representative responding to the customer at a third time, according to an embodiment.

Based on this information, the support representative 312 moves the conversation forward more easily. As shown in FIG. 8, the chat message component 354 provides the next exchange between the two participants ("MSR: OK, the money has been transferred./Customer: How can I do this myself for next time?"/MSR: I'm afraid this type of transfer is not available to you at your current account level"). In other words, the support representative 312 has responded to the second user's question with a limitation. Second user 340 immediately expresses his disapproval of this limitation in FIG. 9.

Figure 9:
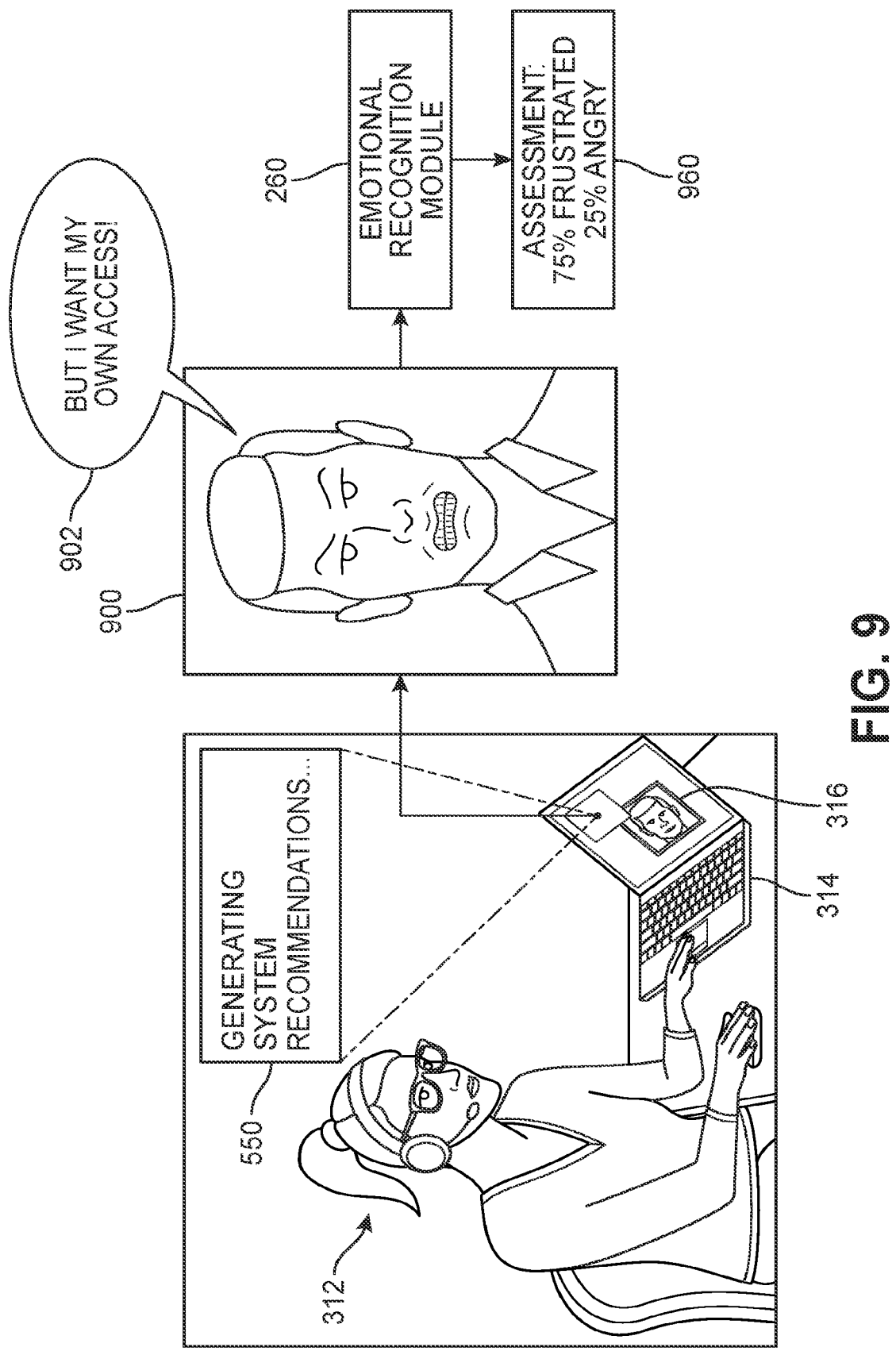
FIG. 9 is an illustration of the conversational assistant system determining an emotional state of the customer around the third time, according to an embodiment.

Indeed, the customer's changed mood in response to the support representative's message is reflected in a third data 900 of FIG. 9. The conversational assistant 550 indicates that the third data 900 (here comprising both video data and audio data) has been received. The third data 900 (represented by a video-image of the second user's face as well as a voice-bubble 902 ("But I want my own access!")) is sent to the emotion recognition module 260. The emotion recognition module 260 generates a third assessment 960 ("Assessment: 75% Frustrated 25% Angry"), again shown merely for purposes of illustration.

Figure 10:
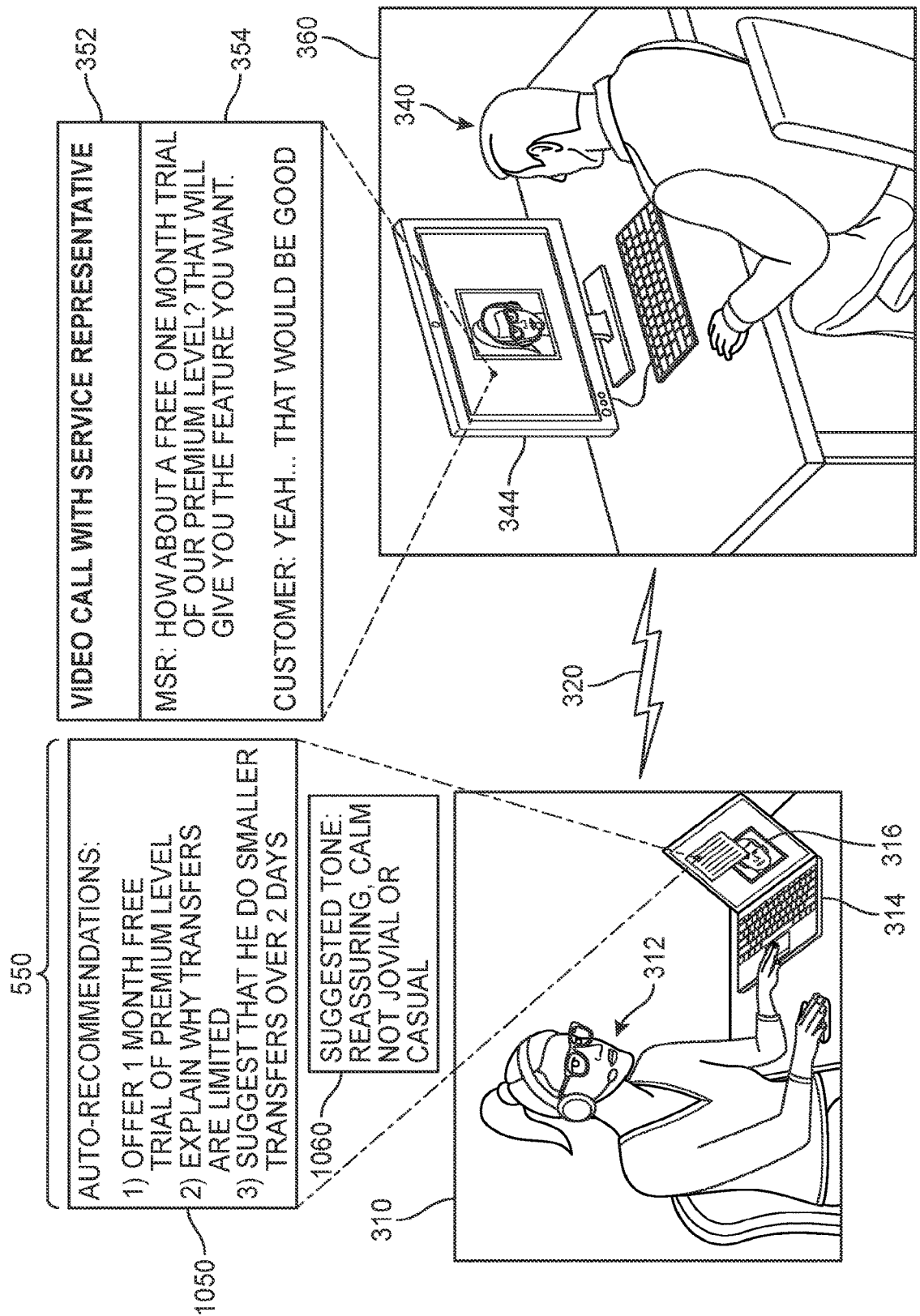
FIG. 10 is an illustration of the conversational assistant system generating recommended solutions to the customer's issue and suggested tone for the service representative to employ based on the determined emotional state around the third time.

In FIG. 10, the support representative 312 is again able to incorporate the knowledge obtained from the conversational assistant into her dialogue with the second user 340 to improve the outcome. In this case, the conversational assistant 550 further presents auto-recommendations 1050 ("1) Offer 1 month free trial of Premium Level Access/(2) Explain why transfers are limited/(3) Suggest that he do smaller transfers over 2 days"), as well as a suggested tone 1060 ("reassuring, calm, not jovial or casual") that better equip the support representative 312 to handle the negative mood of the customer. In some embodiments, the suggested tone can be generated using the intelligent recommendation model (see FIGS. 2A and 2B). For example, the chat message component 354 conveys her response in an attempt to de-escalate or manage the second user's expectations ("MSR: How about a free one-month trial of our Premium Level? That will give you the feature you want./Customer: Yeah . . . . That would be good."). Thus, equipped with a much better understanding of the customer's mood, the support representative 312 is empowered to interact with her customers in a far more responsive, alert, and thoughtful manner, significantly improving customer experiences.

Figure 11:
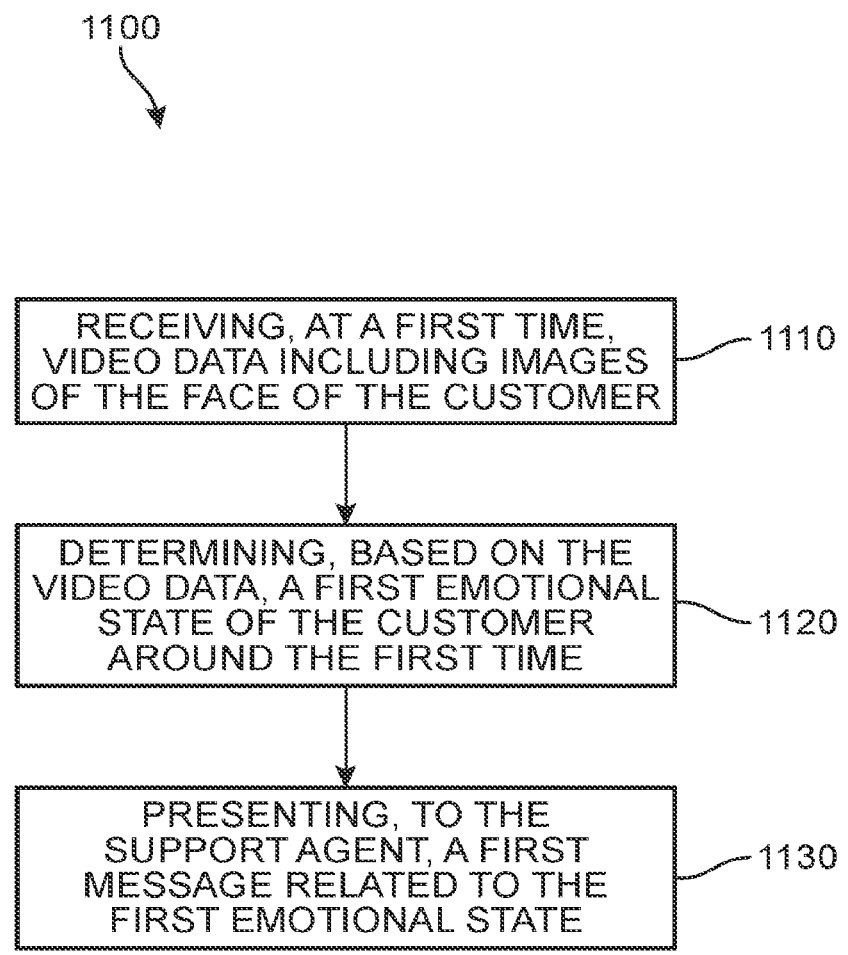
FIG. 11 is a flow diagram of a process for facilitating customer support experiences by presenting information regarding a customer's emotional state to a support agent, according to an embodiment.

FIG. 11 is a flow chart illustrating an embodiment of a method 1100 for facilitating customer support experiences by presenting information regarding a customer's emotional state to a support agent. The method 1100 includes a first step 1110 of receiving, at a first time via a communication application, video data including images of the face of the customer. A second step 1120 includes determining, based on the video data, a first emotional state of the customer (i.e., the emotional state around the first time). A third step 1130 includes presenting, at a computing device for the support agent, a first message related to the first emotional state.

In other embodiments, the method may include additional steps or aspects. In some embodiments, the method also includes steps of submitting the video data to an emotion recognition model, and using the emotion recognition model to classify features of the video data into an emotional category based on macro-expressions and/or micro-expressions detected in the video data. In one example, the video data is received in real-time during a communication session between the customer and the support agent.

In some other embodiments, the method further includes steps of receiving, at a second time via the communication application, audio data including speech produced by the customer, determining, based on the audio data, a second emotional state of the customer (i.e., the emotional state around the second time), and presenting, at the computing device, a second message related to the second emotional state. In such cases, the method may also include steps of submitting the audio data to an emotion recognition model, and classifying the audio data into an emotional category based on language, prosody, and/or tone detected in the audio data. In some embodiments, the first time and the second time may be different times, and in other embodiments, the first time and the second time refer to the same time. The content of the first message and the second message may be the same (and refer to the same message), or the two may differ in content, and one or both may presented to the end-user.

In other examples, the method may include automatically presenting, at the computing device, a recommended solution based in part on the output of the emotion recognition model and an issue that has been associated with the customer. In some embodiments, the method further includes automatically presenting, at the computing device, a suggested tone for the support agent to employ during the communication session based in part on the output of the emotion recognition model.

Other methods can also be contemplated within the scope of this disclosure. For example, a method of providing intelligent conversational assistance to an end-user during a communication session is disclosed. The method can include a first step of receiving, at a first time via a communication application, video data including images of a face of a participant. The method also includes a second step of determining, based on the video data, a first emotional state of the participant around the first time. Furthermore, the method includes a third step of presenting, at a computing device for the end-user, a first message providing a recommended solution to an issue concerning the participant, the recommended solution based in part on the determined first emotional state.

In other embodiments, this method may include additional steps or aspects. In one embodiment, the video data is received in real-time during a communication session between the customer and the support agent and the first message is presented shortly after the video data is received. In another example, the method also involves steps of receiving, at a second time via the communication application, audio data including speech produced by the customer, determining, based on the audio data, a second emotional state of the customer around the second time, and presenting, at the computing device, a second message related to the second emotional state.

In some embodiments, the method may also include submitting the audio data to an emotion recognition model that is configured to classify the audio data into an emotional category based on language, prosody, and/or tone detected in the audio data. In another example, the method can include submitting the video data to an emotion recognition model that is configured to classify the video data into an emotional category based on macro-expressions and/or micro-expressions detected in the video data. In one embodiment, the method may also involve automatically presenting, at the computing device, a suggested tone for the end-user to employ during the communication session based in part on the output of the emotion recognition model.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for facilitating customer support experiences by presenting information regarding a customer's emotional state to a support agent, the method comprising:
   receiving, at a first time via a communication application, video data including images of a face of the customer;
   determining, based on the video data, a first emotional state of the customer around the first time with an emotional recognition model by using the emotion recognition model to classify features of the video data into an emotional category based on macro-expressions and/or micro-expressions detected in the video data;
   automatically determining a solution to a problem articulated by the customer using an intelligent recommendation machine learning model, the solution being based on the determination of the first emotional state of the customer, a solutions database, and feedback received from the support agent in prior encounters with other customers; and
   presenting, at a computing device for the support agent, the solution determined by the intelligent recommendation machine learning model and a first message related to the first emotional state that includes identification of the first emotional state of the customer and prompts the support agent to incorporate the identification of the first emotional state into the support agent's dialogue with the customer;
   wherein the intelligent recommendation machine learning model further identifies a suggested tone for the support agent to use when engaging in dialogue with the customer, and presents the suggested tone in the first message that is presented at the computing device for the support agent; the suggested tone being likely to help appease, placate, or otherwise moderate the conversation with the customer in view of the first emotional state of the customer;
   wherein the intelligent recommendation machine learning model is configured to learn over time, by using at least feedback from the support agent upon termination of a communication session with the customer, wherein the feedback is received by the intelligent recommendation machine learning model automatically from the computing device for the support agent upon termination of the communication session with the customer.

2. The method of claim 1, wherein the video data is received in real-time during a communication session between the customer and the support agent.

3. The method of claim 1, further comprising:
   receiving, at a second time after the solution and first message have been presented to the customer via the communication application, audio data including speech produced by the customer in response to having received the solution and the first message;
   determining, based on the audio data, a second emotional state of the customer around the second time;
   analyzing a change between the first emotional state and the second emotional state; and
   presenting, at the computing device, a second message related to the second emotional state.

4. The method of claim 3, further comprising:
   submitting the audio data to the emotion recognition model; and
   classifying the audio data into an emotional category based on language, prosody, and/or tone detected in the audio data.

5. The method of claim 2, further comprising automatically presenting, at the computing device, a suggested tone for the support agent to employ during the communication session based in part on the output of the emotion recognition model.

6. A method of providing intelligent conversational assistance to an end-user during a communication session, the method comprising:
   receiving, at a first time via a communication application, data including images of a face of a participant;

determining, based on the data, a first emotional state of the participant around the first time with an emotional recognition model by using the emotion recognition model to classify features of the data into an emotional category based on macro-expressions and/or micro-expressions detected in the data;

automatically determining a solution to a problem articulated by the customer using an intelligent recommendation machine learning model, the solution being based on the determination of the first emotional state of the customer, a solutions database, and feedback received from the support agent in prior encounters with other customers; and presenting, at a computing device for the end-user, the solution determined by the intelligent recommendation machine learning model and a first message related to the first emotional state that includes identification of the first emotional state of the customer and prompts the support agent to incorporate the identification into the support agent's dialogue with the customer;

wherein the intelligent recommendation machine learning model further identifies a suggested tone for the support agent to use when engaging in dialogue with the customer, and presents the suggested tone in the first message that is presented at the computing device for the support agent; the suggested tone being likely to help appease, placate, or otherwise moderate the conversation with the customer in view of the first emotional state of the customer;

wherein the intelligent recommendation machine learning model is configured to learn over time, by using at least feedback from the support agent upon termination of a communication session with the customer, wherein the feedback is received by the intelligent recommendation machine learning model automatically from the computing device for the support agent upon termination of the communication session with the customer.

7. The method of claim 6, wherein the data is received in real-time during a communication session between the customer and the support agent and the first message is presented shortly after the data is received.

8. The method of claim 6, further comprising:

receiving, at a second time after the solution and first message have been presented to the customer via the communication application, audio data including speech produced by the customer in response to having received the solution and the first message;

determining, based on the audio data, a second emotional state of the customer around the second time;

analyzing a change between the first emotional state and the second emotional state; and presenting, at the computing device, a second message related to the second emotional state.

9. The method of claim 8, further comprising submitting the audio data to the emotion recognition model that is configured to classify the audio data into an emotional category based on language, prosody, and/or tone detected in the audio data.

10. A system for facilitating customer support experiences, the system comprising a processor and machine-readable media including instructions which, when executed by the processor, cause the processor to:

receive, at a first time via a communication application, video data including images of a face of a customer;

determine, based on the video data, a first emotional state of the customer around the first time with an emotional recognition model by using the emotion recognition model to classify features of the video data into an emotional category based on macro-expressions and/or micro-expressions detected in the video data;

automatically determining a solution to a problem articulated by the customer using an intelligent recommendation machine learning model, the solution being based on the determination of the first emotional state of the customer, a solutions database, and feedback received from the support agent in prior encounters with other customers; and present, at a computing device for a support agent, the solution determined by the intelligent recommendation machine learning model and a first message related to the first emotional state that includes identification of the first emotional state of the customer and prompts the support agent to incorporate the identification into the support agent's dialogue with the customer;

wherein the intelligent recommendation machine learning model further identifies a suggested tone for the support agent to use when engaging in dialogue with the customer, and presents the suggested tone in the first message that is presented at the computing device for the support agent; the suggested tone being likely to help appease, placate, or otherwise moderate the conversation with the customer in view of the first emotional state of the customer;

wherein the intelligent recommendation machine learning model is configured to learn over time, by using at least feedback from the support agent upon termination of a communication session with the customer, wherein the feedback is received by the intelligent recommendation machine learning model automatically from the computing device for the support agent upon termination of the communication session with the customer.

11. The system of claim 10, wherein the video data is received in real-time during a communication session between the customer and the support agent.

12. The system of claim 10, wherein the instructions further cause the processor to:

receive, at a second time after the solution and first message have been presented to the customer via the communication application, audio data including speech produced by the customer in response to having received the solution and the first message;

determine, based on the audio data, a second emotional state of the customer around the second time;

analyzing a change between the first emotional state and the second emotional state; and present, at the computing device, a second message related to the second emotional state.

13. The system of claim 12, wherein the instructions further cause the processor to:

submit the audio data to the emotion recognition model; and classify the audio data into an emotional category based on language, prosody, and/or tone detected in the audio data.

* * * * *